Sept. 12, 1961  C. L. SEEFLUTH  2,999,560
SEPARATION FOR FLARE SYSTEMS
Filed Dec. 20, 1956
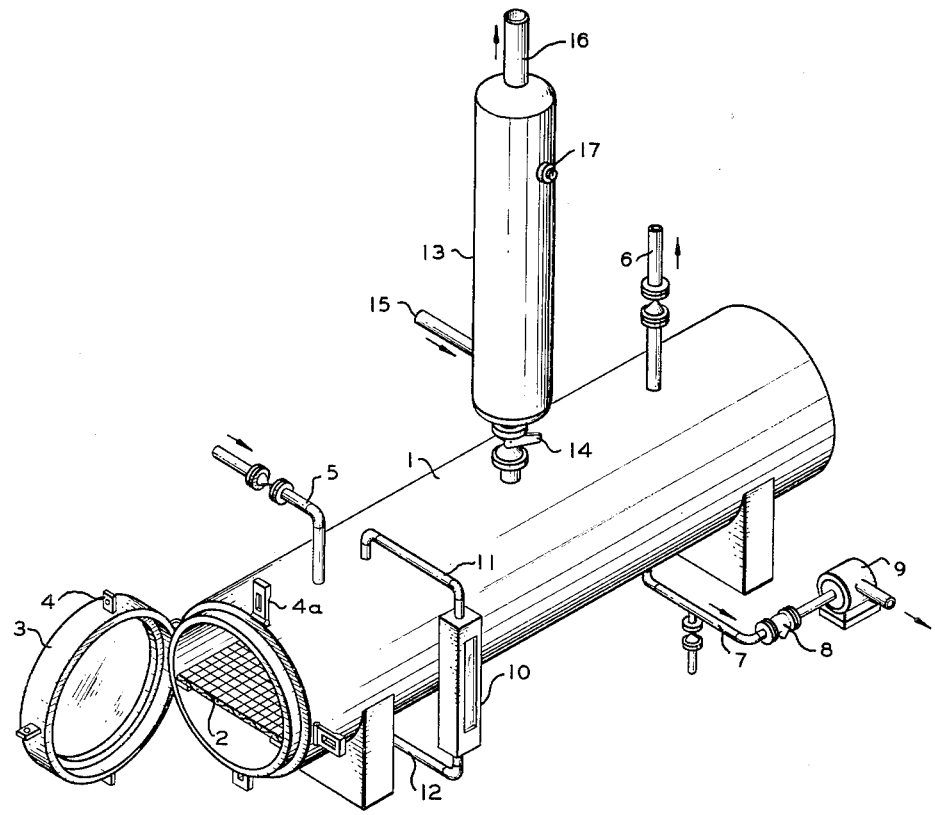
INVENTOR.
C.L. SEEFLUTH
BY *Hudson & Young*
ATTORNEYS ial Number 573,877.

United States Patent Office

2,999,560
Patented Sept. 12, 1961

2,999,560
SEPARATION FOR FLARE SYSTEMS
Charles L. Seefluth, Bartlesville, Okla., assignor to Phillips Petroleum Company, a corporation of Delaware
Filed Dec. 20, 1956, Ser. No. 629,729
3 Claims. (Cl. 183—2.5)

This invention relates to an apparatus. In one aspect this invention relates to a novel apparatus for use in a flare system wherein the flare contains solids, liquids and gases. In another of its aspects, this invention relates to an improved blow down system for a 1-olefin polymerization reactor.

In many industrial processes, reactors and the like operate under pressure and such vessels are generally equipped with safety valves, i.e., one that opens when pressure exceeds a predetermined pressure, which in turn, opens to a flare. Where solids and liquids, as well as gases are present, trouble is encountered in liquids and/or solids being flared, burning and falling to the ground endangering personnel and buildings. Also, solids often clog the flare lines which are necessarily of great heights so as not to expose personnel. Frequently, the liquid and/or solids can be recovered for further processing.

It is an object of this invention to provide a novel blow down and separation apparatus.

It is another object of this invention to provide an apparatus for removing liquids and solids from a flare system.

It is still another object of this invention to provide an apparatus for removing solids from a flare in a pressure release apparatus.

Still other objects, advantages and features of this invention will be obvious to those skilled in the art having been given this disclosure.

The apparatus of this invention comprises, in combination, a blow down vessel superimposed on a separator tank having a screen separating same into an upper and lower section, said blow down vessel and separator vessel having a valve therebetween; means for removing liquid from the separator tank and means for opening at least one end of said separator tank.

As has been indicated, the apparatus of this invention is useful in separating solids and liquids entrained in a high velocity stream of gas. In particular, the apparatus is ueful in conjunction with pop off or safety valves wherein excess pressure is flared from a process system. I have particularly found the apparatus of this invention useful in conjunction with a polymerization reactor wherein 1-olefins are being polymerized.

This invention is applicable to the older well known high temperature polymerization methods as well as the newer catalytic methods such as with organo-metal catalysts as disclosed by Karl Ziegler in Belgian Patent 533,362, November 16, 1954, or in the presence of a chromium oxide catalyst as disclosed in the copending application of Hogan and Banks, filed March 26, 1956, now Patent No. 2,825,721, and having Serial No. 573,877.

In the Hogan et al. application, a process is disclosed for producing novel polymers of 1-olefins by carrying out the polymerization at a temperature in the range of 100 to 500° F., and a pressure in the range of atmospheric to 1000 p.s.i.g. or more, but generally will be in the range of 300 to 500 p.s.i.g. for liquid phase polymerization. The polymerization is carried out in the presence of 0.1 to 10 or more weight percent of chromium as chromium oxide, including a substantial proportion of hexavalent chromium associated with at least one porous oxide selected from the group consisting of silica, alumina, zirconia, and thoria. A preferred catalyst is one comprising 0.1 to 10 weight percent chromium as the oxide on a silica-alumina support such as 90 percent silica-10 percent alumina. This catalyst is a highly oxidized catalyst which has been activated by high-temperature treatment, e.g., 450–1500° F. preferably 900 to 1000° F. in a non-reducing atmosphere and preferably with an oxidizing gas such as anhydrous air. The polymerization is preferably carried out in the liquid phase such as in solution in a hydrocarbon solvent, especially a paraffin or cycloparaffin which is liquid under the polymerizaiton conditions; however, vapor phase operation or mixed phase operation can be effected. This invention is particularly applicable to polymers prepared by the above method in liquid phase operation.

Frequently, in the Hogan et al. method, liquid phase operation is preferred. In such cases, sufficient pressure is required to maintain the reactants in liquid phase, e.g., 300–500 p.s.i.g. The polymerization is exothermic and sometimes excessive pressure builds up causing the relief valve on the vessel to open. It is in conjunction with such an operation that this invention is useful. It will be understood by those skilled in the art that while such a use of the present invention is typical, the invention apparatus can be used in many applications wherein solids and liquids are to be separated from a high velocity gas stream.

The particular apparatus can best be described by reference to the attached drawing which is a schematic illustration of the invention apparatus. To simplify the description and to make the operation thereof more easily understood, the operation of the apparatus will be described in conjunction with a flare system from an ethylene polymerization system.

Referring now to the drawing, vessel 1 is separated into an upper section and a lower section by screen 2. One end of the vessel is supplied with a hinged cover 3. The other end can be so equipped or it can be sealed as shown. The hinged cover and vessel are fitted with locking dogs 4 and 4a. Conduit 5 is provided to pass an inert gas, such as steam, into the vessel 1 and vent conduit 6 is provided as a gas escape. Conduit 7, strainer 8 and pump 9 are provided to remove liquid from vessel 1. Liquid level gauge 10 is connected to vessel 1 via conduits 11 and 12. Disposed generally above vessel 1 is blow down vessel 13 which is connected to vessel 1 through valve 14. This blow down vessel 13 is connected to the relief system (not shown) via conduit 15 and to flare via conduit 16. Level alarm 17 is operably installed in vessel 13 to indicate the maximum safe liquid level in that vessel.

In one specific embodiment, vessel 1 is a 1000 gal. 5 p.s.i. tank mounted horizontally. Screen 2 divides the tank into two sections of approximately equal volumes and the screen consists of a ½ x ½ inch grill covered with 1/16" mesh screen. The conduits 5, 6, 7, 11 and 12 are 1" pipe section and the pump 9 has a capacity of 10 g.p.m. Vessel 13 is a 2000 gal.-10 p.s.i. tank and is mounted vertically above vessel 1 through 8" quick opening plug valve 14. The liquid level alarm 17 is mounted to alarm at ⅔ full. Conduits 15 and 16 are of 4" steel-pipe. The liquid level gauge 10 is a commercial sight glass gauge.

It will be obvious to those skilled in the art that many modifications can be made in the apparatus without departing from the scope of the invention. For example, the vessels do not have to be cylindrical, the screen can be elevated or lowered and can be of various mesh depending upon particle size of solids, etc. The alarm can be a different elevation or not used at all, baffles can be employed in the blow down vessel to help separate entrained matter from the gas stream. Those skilled in the art will see many other changes which can be made and still obtain the advantages of the invention.

In the operation of the apparatus, valve 14 is in the closed position. When the relief valve on the ethylene polymerization reactor (not shown) opens, ethylene, solvent catalyst and polyethylene is blown via conduit 15 to vessel 13 wherein the velocity of the stream is reduced by the greater diameter of vessel 13 and liquids and solids, e.g., cyclohexane and polyethylene, settle out and the gaseous ethylene passes overhead via conduit 16. When the relief valve closes, valve 14 is opened draining the solids and liquids into vessel 1 and valve 14 is then closed. The material falls on screen 2 where the solids are held and the liquid drains through. Pump 9 is started drawing solvent from vessel 1 through conduit 7 and fines screen 8. When the liquid is removed as shown by glass 10, pump 9 is stopped and the vessel 1 is swept free of solvent vapors by passing an inert gas such as nitrogen, carbon dioxide, flue gas, steam or the like through vessel 1 via conduit 5 and vent 6. In the present embodiment, steam is used. Any condensate can be removed via conduit 7 and pump 9. Hinged door 3 which has been closed and sealed via locking dogs 4 and 4a is opened and solids removed from the screen 2. The door 3 is then closed and the vessel is ready to receive another batch from vessel 13. If during the emptying of vessel 1, the relief valve should open again, the liquid and solids can be contained in vessel 13 until vessel 1 is ready. However, should vessel 13 be filling too fast, alarm 17 will sound and some of the material can be drained. If desired, valve 14 can remain open until vessel 1 is ready for cleaning. Where the amount of solids entrained is small as compared to the gas and liquid, it will only be necessary to open door 3 after several cycles in which case valve 14 need only be closed at that time.

I claim:

1. An apparatus comprising in combination a horizontally disposed first vessel containing a sole horizontal screen separating said vessel into an upper section and a lower section, said vessel having at least one removal end; means for introducing gas to said vessel; separate conduit means for venting the upper section of said vessel; means for withdrawing liquid from the lower section of said vessel; a second vessel disposed directly above and communicating with the upper section of said first vessel through a valved means; means for introducing a high velocity gas stream containing liquids and solids entrained therein into a lower portion of said second vessel, said second vessel being adapted for phase separation of said gas stream; and means for flaring the gas from said second vessel.

2. The apparatus of claim 1 wherein said valved means is a quick opening plug valve.

3. An apparatus comprising in combination a horizontally disposed cylindrical vessel containing a horizontally mounted screen separating said vessel into an upper section and a lower section, said vessel having at least one removal end; means for indicating the level of liquid in said vessel; means for withdrawing liquids from the lower section of said vessel; means for admitting gas to said vessel; separate conduit means in the upper level of said vessel for venting gases therefrom; a vertically disposed cylindrical vessel elevated above said horizontally disposed vessel and communicating with said upper section of said horizontally disposed vessel through a valved means; means for introducing a feed stream to said vertically disposed vessel, said vertical vessel being adapted for phase separation of said feed stream; separate conduit means for flaring gases from said vertically disposed vessel and means for indicating the rise of liquid in said vertically disposed vessel.

References Cited in the file of this patent

UNITED STATES PATENTS

| 532,829 | Snyder | Jan. 22, 1895 |
| 627,675 | Zwietusch et al. | June 27, 1899 |
| 1,873,594 | Johnson | Aug. 23, 1932 |
| 2,198,412 | McDonald | Apr. 23, 1940 |
| 2,522,429 | Buchan | Sept. 12, 1950 |
| 2,626,007 | Musslewhite et al. | Jan. 20, 1953 |
| 2,651,418 | Prendergast | Sept. 8, 1953 |
| 2,785,766 | Murdock | Mar. 19, 1957 |

FOREIGN PATENTS

| 748,736 | France | Apr. 25, 1933 |